US008266082B2

(12) United States Patent
Lu et al.

(10) Patent No.: US 8,266,082 B2
(45) Date of Patent: Sep. 11, 2012

(54) CONTEXT INFERENCE SYSTEM PROVIDING INFORMATION TO USER ACCORDING TO CONTEXT AND METHOD THEREOF

(75) Inventors: Tung-Hung Lu, Yilan County (TW); Li-Dien Fu, Kingmen County (TW); Ming-Shien Weng, Taichung County (TW); Allen Huang, Taoyuan County (TW)

(73) Assignee: Industrial Technology Research Institute, Hsinchu (TW)

( * ) Notice: Subject to any disclaimer, the term of this patent is extended or adjusted under 35 U.S.C. 154(b) by 1274 days.

(21) Appl. No.: 11/968,827

(22) Filed: Jan. 3, 2008

(65) Prior Publication Data

US 2009/0063372 A1    Mar. 5, 2009

(30) Foreign Application Priority Data

Sep. 4, 2007 (TW) .............................. 96132884 A

(51) Int. Cl.
*G06E 1/00* (2006.01)
*G06F 15/18* (2006.01)
(52) U.S. Cl. ................. 706/21; 706/12; 706/62
(58) Field of Classification Search ........................ None
See application file for complete search history.

(56) References Cited

U.S. PATENT DOCUMENTS

| 6,370,513 | B1 * | 4/2002 | Kolawa et al. ............... 705/7.33 |
| 7,020,494 | B2 | 3/2006 | Spriestersbach et al. ...... 455/566 |
| 7,155,405 | B2 | 12/2006 | Petrovich ........................ 705/26 |
| 7,200,563 | B1 | 4/2007 | Hammitt et al. .................... 705/7 |
| 2002/0173295 | A1 | 11/2002 | Nykanen et al. ............... 455/414 |
| 2006/0277467 | A1 | 12/2006 | Reponen et al. ............... 715/708 |
| 2007/0022074 | A1 | 1/2007 | Muramatsu et al. ............ 706/50 |
| 2007/0032261 | A1 | 2/2007 | Boyer et al. ................ 455/550.1 |
| 2007/0060114 | A1 * | 3/2007 | Ramer et al. ................... 455/418 |
| 2007/0061245 | A1 * | 3/2007 | Ramer et al. ..................... 705/37 |
| 2007/0192294 | A1 * | 8/2007 | Ramer et al. ....................... 707/3 |
| 2007/0198485 | A1 * | 8/2007 | Ramer et al. ....................... 707/3 |

FOREIGN PATENT DOCUMENTS

| CN | 1989523 | 6/2007 |
| TW | I31142 | 3/2007 |

OTHER PUBLICATIONS

Chinese Examination Report of Taiwan Application No. 096132884, dated Mar. 29, 2011.

* cited by examiner

*Primary Examiner* — Jeffrey A Gaffin
*Assistant Examiner* — Adrian Kennedy
(74) *Attorney, Agent, or Firm* — J.C. Patents

(57) ABSTRACT

A context inference system including a mobile device and at least one information sending unit is provided. The mobile device includes an information receiving unit and a context operation platform. The information receiving unit receives a context information. The context operation platform includes an information collection module for collecting the information used for inferring a context based on a convergent search and an expanded search, a data classification and storage module for storing and classifying a user preference information of a user, and an inference module for inferring a context. The information sending unit transmits the context information to the mobile device. The context operation platform performs a context inference process according to the context information and the user preference information in order to forecast the user's need and provide a recommendation information to the user.

38 Claims, 8 Drawing Sheets

CONTEXT INFERENCE SYSTEM PROVIDING INFORMATION TO USER ACCORDING TO CONTEXT AND METHOD THEREOF

CROSS-REFERENCE TO RELATED APPLICATION

This application claims the priority benefit of Taiwan application serial no. 96132884, filed Sep. 4, 2007. All disclosure of the Taiwan application is incorporated herein by reference.

BACKGROUND OF THE INVENTION

1. Field of the Invention

The present invention generally relates to a content recommendation system and a method thereof, in particular, to a context inference system and a method thereof which can provide an information to a user according to a context.

2. Description of Related Art

Personal handheld devices have been broadly spread along with the advancement in handheld techniques and the reduction in the fabrication cost thereof. It is expected that with the constantly decreasing hardware cost, more software services will be provided. In other words, user innovative content services for handheld devices will become the mainstream of the market.

Presently, the most common content service received by cell phone users is short message service (SMS). However, according to a desirable operation logic of a mobile service, while providing a content to a user, the information provided should be pushed based on a context. For example, short messages regarding related activities within a specific area can be sent to all the mobile users within the area. However, such a content service cannot provide information to a user based on the features and context around the user, and accordingly such short messages are mostly considered junk messages to the user. Thereby, it is needed to develop a system for providing useful information based on the contexts of mobile users.

A context-aware mobile communication device is disclosed in U.S. Patent No. 2007/0032261 ("Context Awareness for A Mobile Communication Device"). In this disclosure, a context-awareness technique is integrated with a mobile communication device, wherein a preset personal or industrial context is stored in a RFID tag so that a user can select the desired context on the mobile communication device by using the RFID tag. A location context-aware mobile system is disclosed in U.S. Pat. No. 7,020,494B2 ("Integrating Contextual Information into Mobile Enterprise Applications"). A mobile system integrated with a context-sensing technique is provided in this disclosure, wherein the location of a handheld device of a user is detected and different interfaces are provided to the user according to the locations of the handheld device so that the process for loading information into the handheld device is simplified and both the procedure and time for inputting information are reduced.

However, in foregoing conventional techniques, a preset interface is provided to a mobile user based on only the location of the user, thus, foregoing subject of providing useful information to the mobile user based on the features and context around the mobile user is still not realized. Thereby, it is needed to provide a context inference system which can provide a content service based on the features and context around a mobile user.

SUMMARY OF THE INVENTION

Accordingly, the present invention is directed to a context inference system which can provide a content service to a user based on the context and habits of the user.

The present invention is directed to a mobile device which can provide a content service to a user based on the context and habits of the user.

The present invention is directed to a context operation platform which can provide a content service to a user based on the context and habits of the user.

The present invention is directed to a context inference method which can provide a content service to a user based on the context and habits of the user.

The present invention is directed to a computer readable recording medium for recording a computer program which executes a context inference method, wherein the context inference method can provide a content service to a user based on the context and habits of the user.

The present invention is directed to a method for providing a service information, wherein the context around a user within a specific environment is provided so that the user can receive a content service based on the context and habits of the user.

The present invention provides a context inference system including a mobile device and at least one information sending unit. The mobile device includes an information receiving unit and a context operation platform. The information receiving unit receives at least one context information. The context operation platform is coupled to the information receiving unit and performs a context inference process. The context operation platform includes an information collection module, a data classification and storage module, and an inference module. The information collection module collects the information used for inferring a context. The data classification and storage module stores and classifies a user preference information of a user. The inference module infers the context. The information sending unit sends the context information to the mobile device. The information sending unit is mounted on an object, and the context information is a related information of the object. The context operation platform performs the context inference process according to the context information and the user preference information in order to forecast the user's need and provide a recommendation information to the user. The context inference process comprises: receiving and collecting the at least one context information by using the information receiving unit and the information collection module; inferring the context based on the user preference information and the at least one context information by using the inference module; and generating the recommendation information according to the context by using the inference module, wherein the step of inferring the context comprises a convergent search and an expanded search.

The present invention provides a context inference system including a mobile device, at least one information sending unit, and a remote server. The mobile device includes an information receiving unit and a context operation platform. The information receiving unit receives at least one context information. The context operation platform is coupled to the information receiving unit and performs a context inference process. The context operation platform includes an information collection module, a data classification and storage module, an inference module, and a service request module. The information collection module collects the information used for inferring a context. The data classification and storage module stores and classifies a user preference information of a user. The inference module infers the context. The service request module obtains a service information. The information sending unit transmits the context information to the mobile device. The information sending unit is mounted on an object, and the context information is a related information of the object. The remote server provides the service information, and includes a service data classification and storage module and a management data module. The service data classification and storage module stores and classifies the service information. The management data module manages the service data classification and storage module. The context operation platform performs the context inference process according to the context information, the service information, and the user preference information in order to forecast the user's need and provide a recommendation information to the user.

The present invention provides a mobile device including an information receiving unit and a context operation platform. The information receiving unit receives at least one context information. The context operation platform is coupled to the information receiving unit and performs a context inference process. The context operation platform includes an information collection module, a data classification and storage module, and an inference module. The information collection module collects the information used for inferring a context. The data classification and storage module stores and classifies a user preference information of a user. The inference module infers the context. The context operation platform performs the context inference process according to the context information and the user preference information in order to forecast the user's need and providing a recommendation information to the user. Wherein the context operation platform further comprises a service request module for obtaining a service information from a remote server.

The present invention provides a context operation platform including an information collection module, a data classification and storage module, a service request module, and an inference module. The information collection module collects the information used for inferring a context. The data classification and storage module stores and classifies a user preference information of a user. The service request module for obtaining a service information from a remote server. The inference module infers the context. The context operation platform performs a context inference process according to a context information and the user preference information in order to forecast the user's need and provide a recommendation information to the user.

The present invention provides a context inference method adaptable to a mobile device having an information receiving unit and a context operation platform. The context inference method includes determining whether at least one context information is received, inferring a context based on the context information and an user preference information of a user when the at least one context information is received, determining whether the context matches the user preference information, and providing the context to the user as a recommendation information if the context matches the user preference information. Wherein the step of inferring the context comprises a convergent search and an expanded search.

The present invention provides a computer readable recording medium for recording a computer program which executes a context inference method. The context inference method includes determining whether at least one context information is received, inferring a context based on the context information and an user preference information of a user when the at least one context information is received, determining whether the context matches the user preference information, and providing the context to the user as a recommendation information if the context matches the user preference information. Wherein the step of inferring the context comprises a convergent search and an expanded search.

The present invention provides a method for providing a service information. The method includes classifying and storing a service information of a specific environment by using a service information classification and storage module, mounting an information sending unit on at least one object in the specific environment for transmitting a context information of the at least one object, providing the context information and the service information to the mobile device when a user carrying a mobile device which includes an information receiving unit and a context operation platform enters the specific environment and turns on the information receiving unit in the mobile device. The context operation platform includes an information collection module for collecting information, a data classification and storage module for storing and classifying a user preference information, an inference module for inferring the context, and a service request module for obtaining the service information. The context operation platform forecasts the user's need and providing a recommendation information to the user according to the context information, the service information, and the user preference information.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
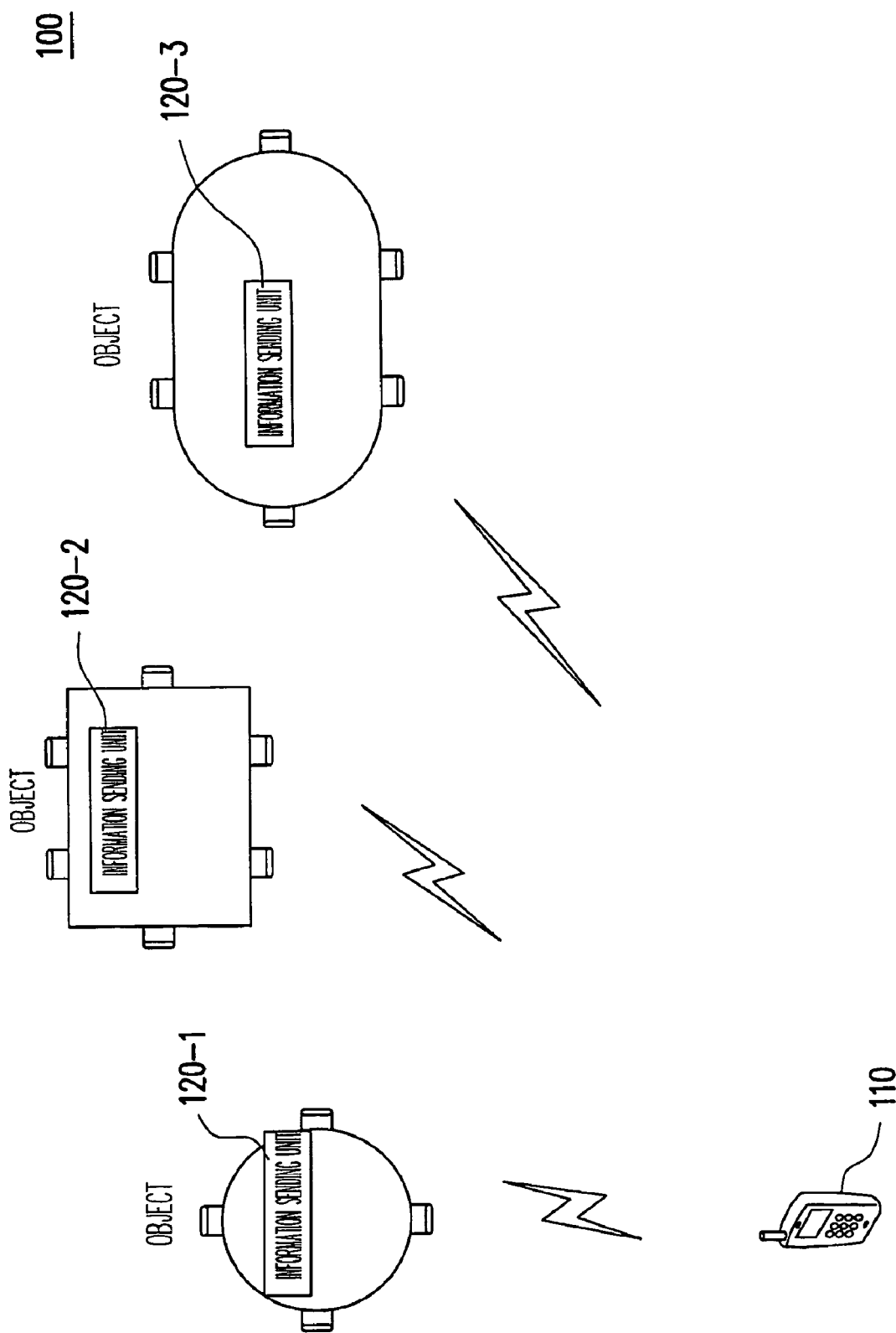
FIG. 1 is a diagram illustrating an operation environment of a context inference system according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
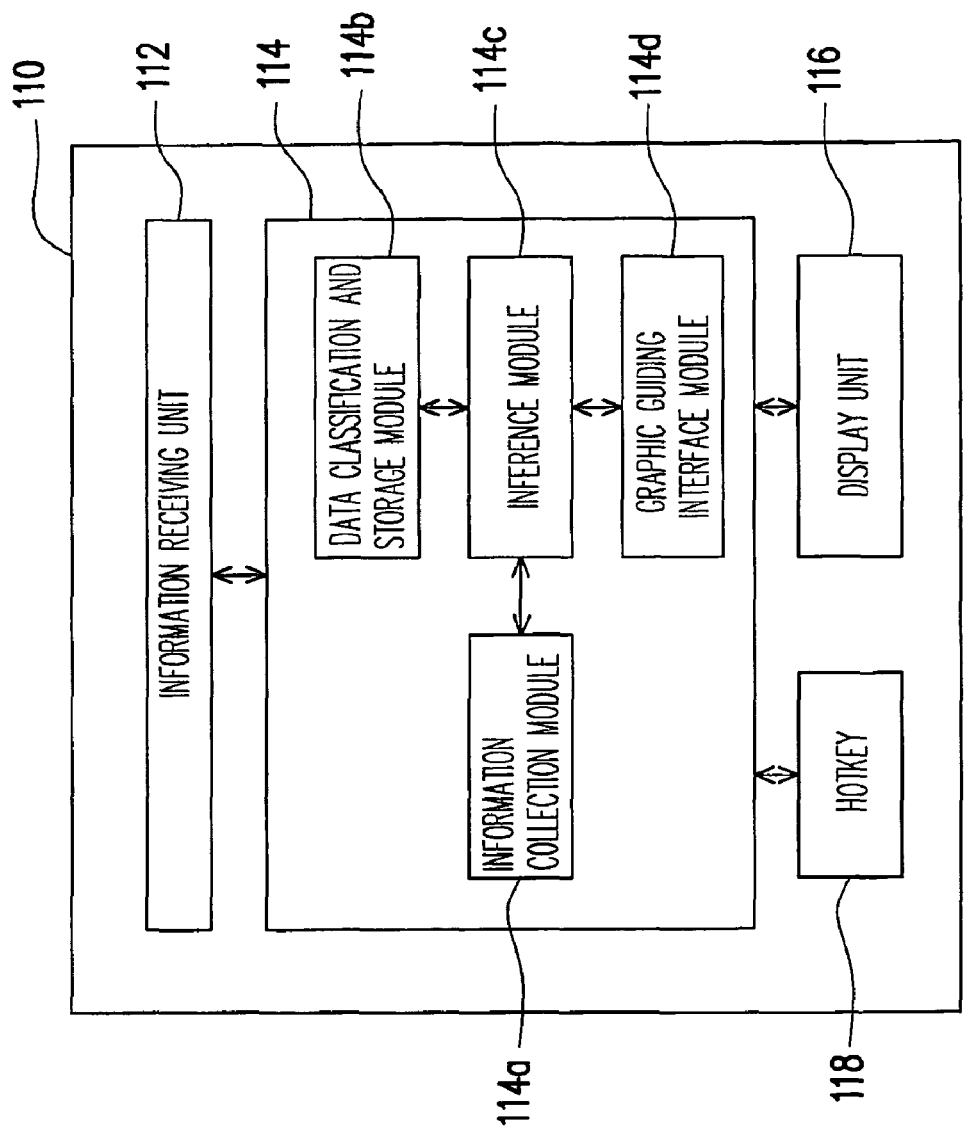
FIG. 2 is a schematic block diagram of a mobile device in FIG. 1.

FIG. 1 is a diagram illustrating an operation environment of a context inference system according to an embodiment of the present invention. FIG. 2 is a schematic block diagram of a mobile device in FIG. 1.

Referring to FIG. 1 and FIG. 2, as shown in FIG. 1, the specific environment in which the context inference system 100 is set up is a furniture store. However, it has to be understood that the application of the context inference system in the present invention is not limited to furniture stores; instead, the context inference system in the present invention may also be applied to another environment such as a supermarket, an amusement park, a second-hand car dealer shop, or a fashion store etc. The context inference system 100 includes a mobile device 110 and a plurality of information sending units 120-1~120-3.

In the present embodiment, the mobile device 110 is a cell phone. However, the mobile device 110 in the present invention may also be a personal digital assistant (PDA), an ultra mobile computer, or other types of devices. In particular, the mobile device 110 has to have an information receiving unit 112 and a context operation platform 114.

The information receiving unit 112 receives a context information, and the context information is sent by the information sending units 120-1~120-3. In particular, the information sending units 120-1~120-3 are respectively mounted on different objects, and the context information is related information of the objects. For example, the context information contains characteristic values regarding the objects, characteristic values regarding the locations of the objects, or a current time. In an embodiment of the present invention, the information receiving unit 112 is a radio frequency (RF) reader and the information sending units 120-1~120-3 are RFID tags. In an embodiment of the present invention, each RFID tag records at least six web ontology language (OWL) meta data, wherein each meta data is a 16-bit short integer. In particular, the OWL meta data will be used in a context inference based on ontology technique described later. However, the implementations of the information receiving unit 112 and the information sending units 120-1~120-3 are not limited in the present invention; instead, the information receiving unit 112 and the information sending units 120-1~120-3 may be any devices which can transmit and receive data.

Figure 3:
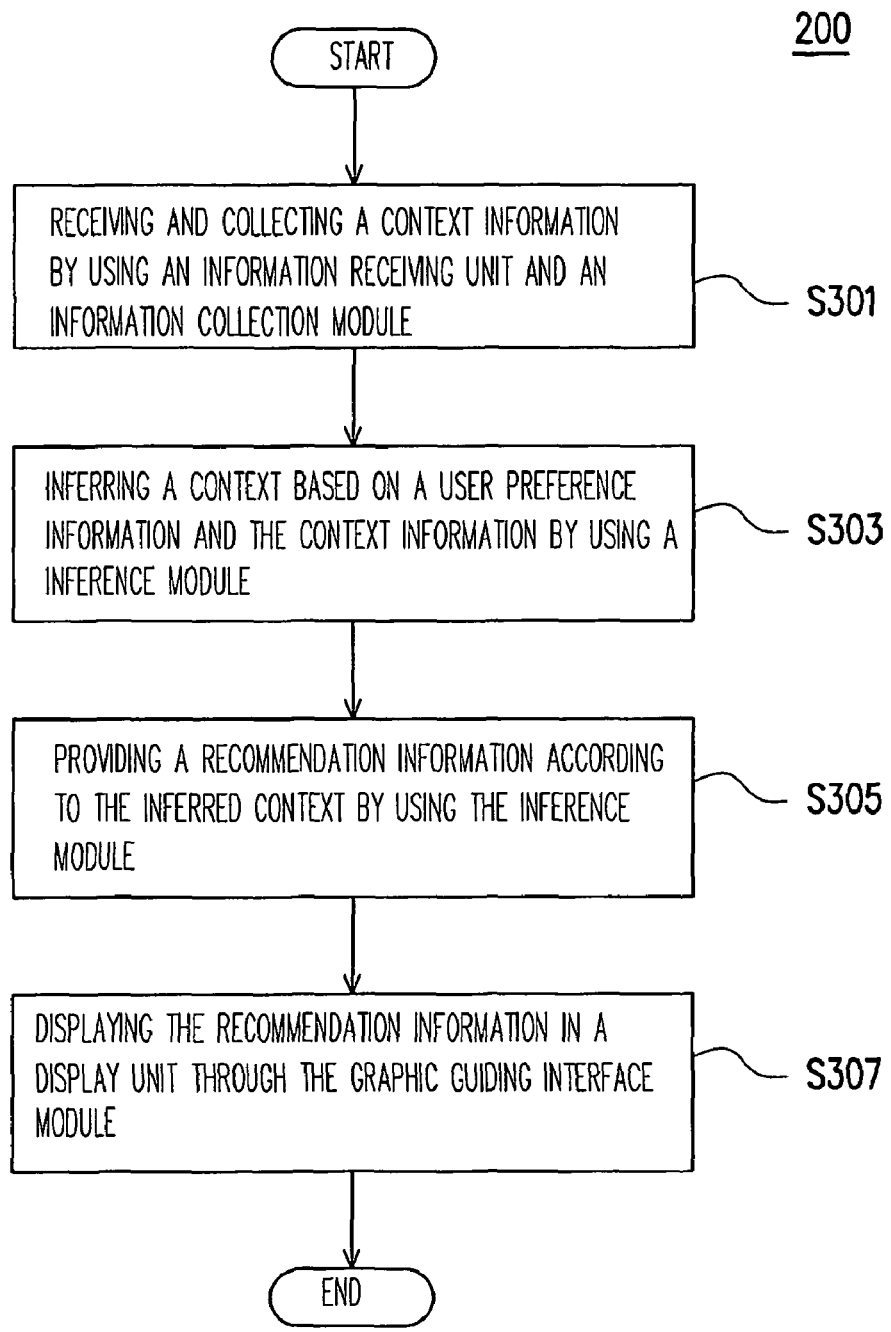
FIG. 3 is a flowchart of a context inference process according to an embodiment of the present invention.

The context operation platform 114 is coupled to the information receiving unit 112 and performs a context inference process 200 (as shown in FIG. 3). The context operation platform 114 includes an information collection module 114a, a data classification and storage module 114b, and an inference module 114c.

The information collection module 114a collects the information used for inferring a context. In the present embodiment, the information used for inferring the context includes a user preference information and the context information.

The data classification and storage module 114b stores and classifies the user preference information. In order to define the characteristics of an object precisely so as to define the user preference information and accordingly infer the context precisely, in an embodiment of the present invention, an ontology technique is adopted by the data classification and storage module 114b. An ontology is a data model that represents a set of concepts within a domain and the relationships between those concepts. Ontology can be used as a communication medium between human and machine or between machines. However, the implementation of the data classification and storage module is not limited in the present invention, and any other suitable classification and storage system may also be applied to the present invention.

The inference module 114c infers a context. To be specific, in the present embodiment, the inference module 114c infers a context according to the user preference information and the context information so as to provide an information to the user. In an embodiment of the present invention, the inference module 114c includes a soft computing clustering technique. The soft computing technique includes neural network (NN), fuzzy set theorem, and genetic algorithm (GA), and which is an intelligent computing technique based on past experience. In the present embodiment, the clustering technique is implemented with a self-organizing map (SOM). A SOM is a type of artificial neural network that is trained using unsupervised learning and which forecasts possible actions based on past experiences. However, the soft computing technique is not limited in the present invention, and any computing technique which can forecast possible actions based on past experiences can be applied to the present invention.

Figure 4A:
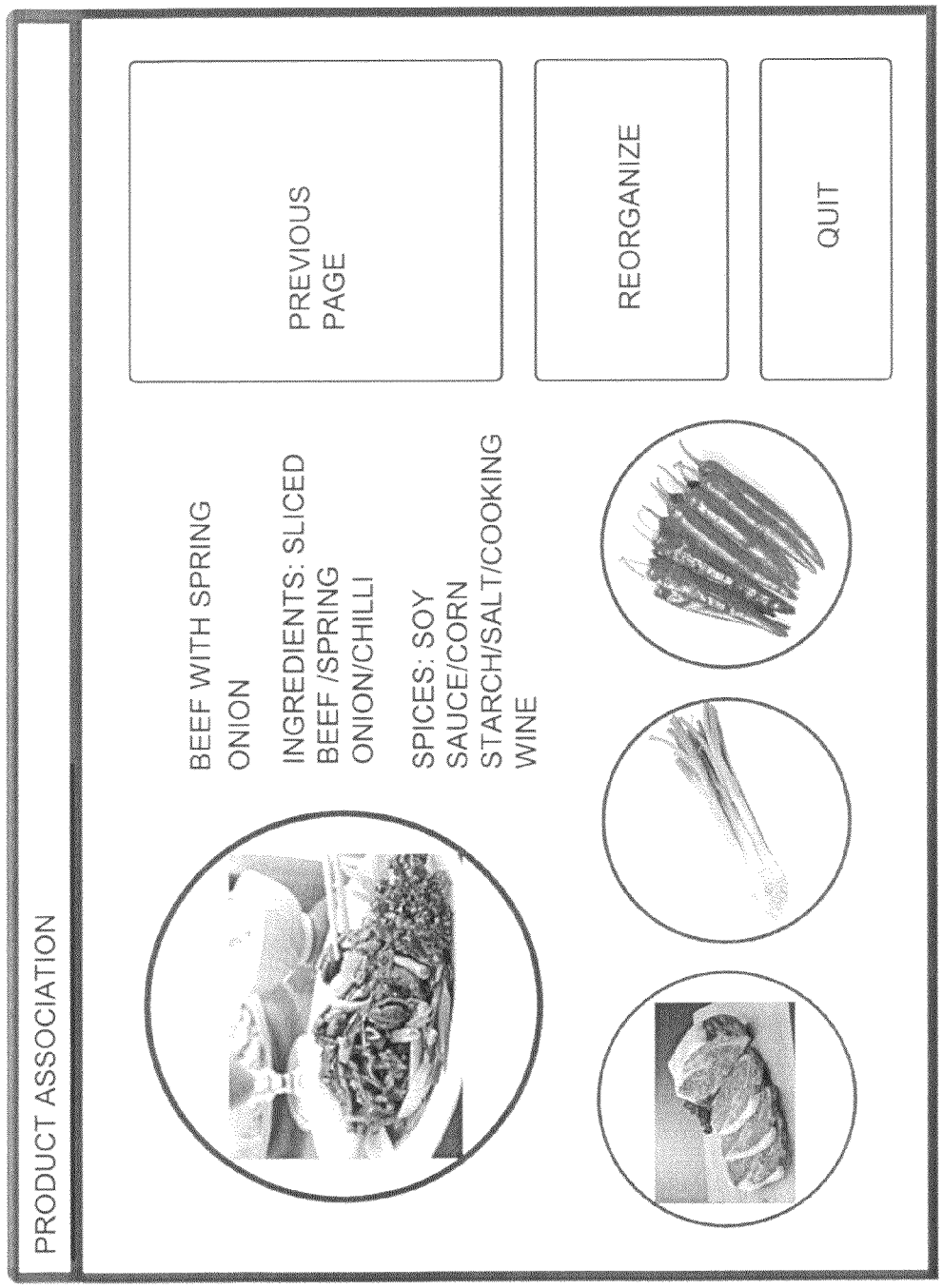
FIG. 4a illustrates an expanded search according to an embodiment of the present invention.
Figure 4B:
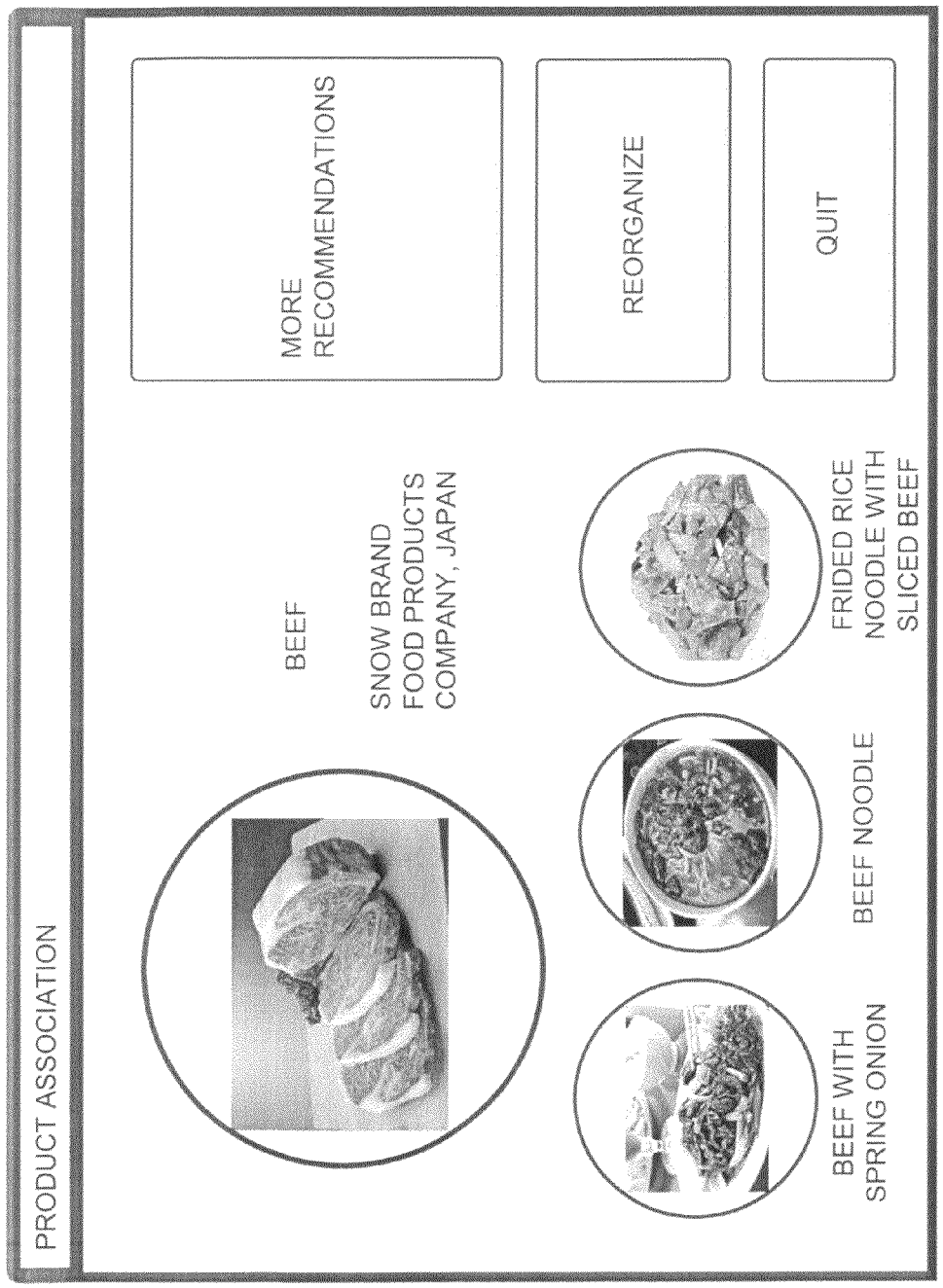
FIG. 4b illustrates a convergent search according to an embodiment of the present invention.

In an embodiment of the present invention, the mobile device 110 further includes a display unit 116 and a graphic guiding interface module 114d in the context operation platform 114. The graphic guiding interface module 114d displays the recommendation information in graphics in the display unit 116 and receives instructions from the user with graphic buttons (as shown in FIG. 4a and FIG. 4b).

In an embodiment of the present invention, the context operation platform 114 performs the context inference process 200 according to the received context information and user preference information so as to infer the context and provide a recommendation information to the user. FIG. 3 is a flowchart of the context inference process 200 according to an embodiment of the present invention.

Referring to FIG. 3, the context inference process 200 includes following steps. A context information is collected by the information receiving unit 112 and the information collection module 114a (step S301). Next, a context is inferred based on the user preference information and the context information by the inference module 114c (step S303), namely, the inference module 114c forecasts a user's need. Finally, a recommendation information is provided by the inference module 114c according to the inferred context (step S305).

Additionally, the context inference process 200 further includes displaying the recommendation information in the display unit 116 through the graphic guiding interface module 114d (step S307).

In the present embodiment, the step S303 includes an expanded search and a convergent search. The expanded search is a procedure which searches for possible usages of a sensed context information. To be specific, when the inference module 114c senses an object and infers that the user may be interested in this object, the inference module 114c provides possible recommendation information to the user based on the user preference information. For example, when the inference module 114c senses "beef" and infers that the user may be interested in "beef", the inference module 114c provides some preferred product associations such as "beef with spring onion", "beef noodle", and "deep fried beef" to the user based on the user preference information (as shown in FIG. 4a).

The convergent search is a procedure which searches for components of an accepted recommendation information. To be specific, when the user accepts a recommendation information provided by the inference module 114c, the inference module 114c further provides detailed information to the user according to the accepted recommendation information. For example, as described above, if the user selects "beef with spring onion", the inference module 114c provides some information such as "sliced beef", "spring onion", and "chilli" to the user. Thus, the user gets to know that besides "sliced beef", the user has to purchase "spring onion" and "chilli" for cooking "beef with spring onion" (as shown in FIG. 4b).

In the present embodiment, the context inference process 200 further includes updating the user preference information to record the fact that the user prefers the recommendation information when the user accepts the recommendation information so that the fact can be used as a reference factor during the next inference process. Additionally, the context inference process 200 further includes updating the user preference information to record the fact that the user does not prefer the recommendation information when the user does not accept the recommendation information so that the fact can be used as a reference factor during the next inference process.

Referring to FIG. 2 again, in the present embodiment, the mobile device 110 further includes a hotkey 118 for turning on the context operation platform 114. However, in another embodiment of the present invention, the mobile device 110 may not include a hotkey 118, and in this case, the mobile device 110 can receive the context information once it is powered on.

Figure 5:
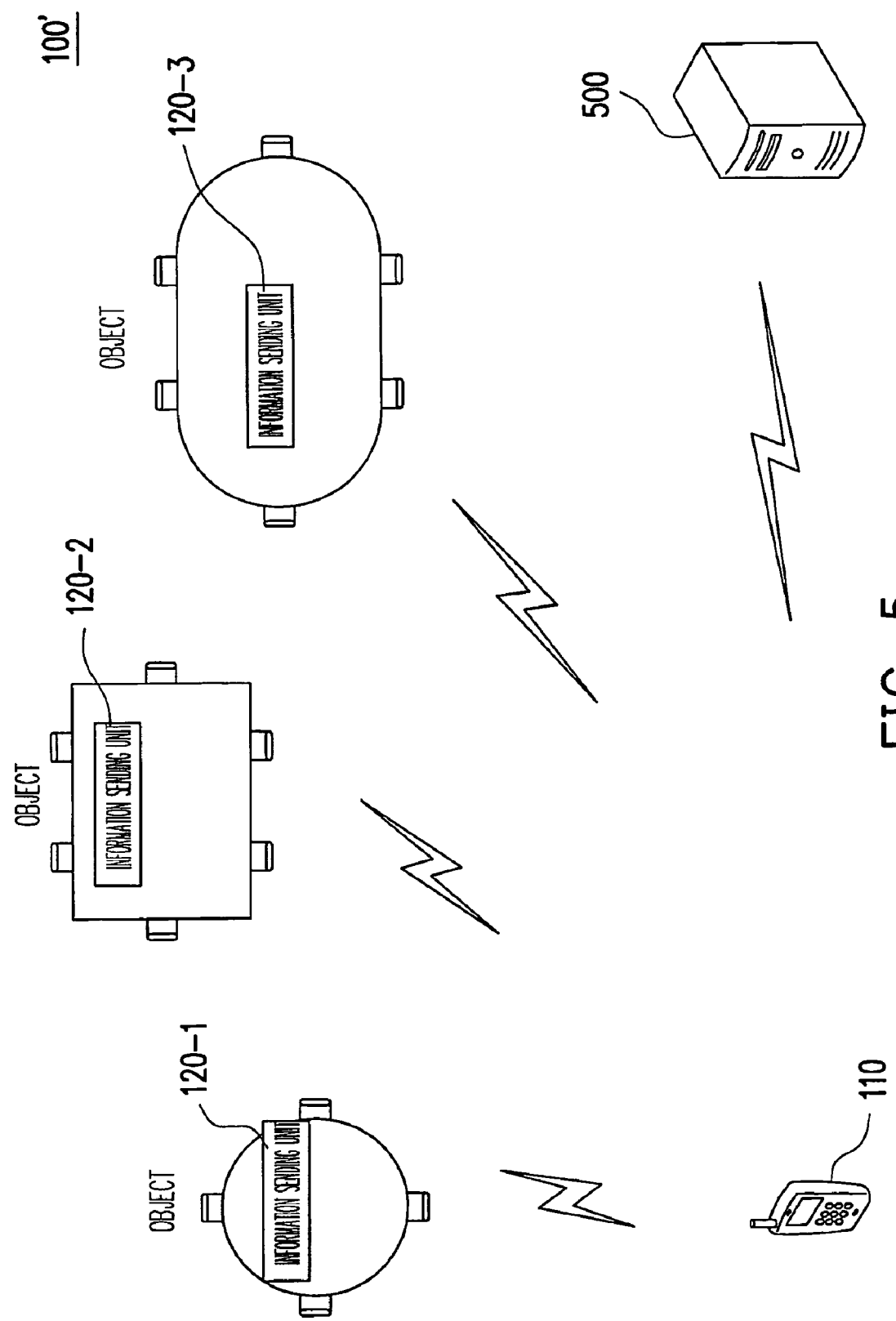
FIG. 5 is a diagram illustrating an operation environment of a context inference system according to an embodiment of the present invention.
Figure 6:
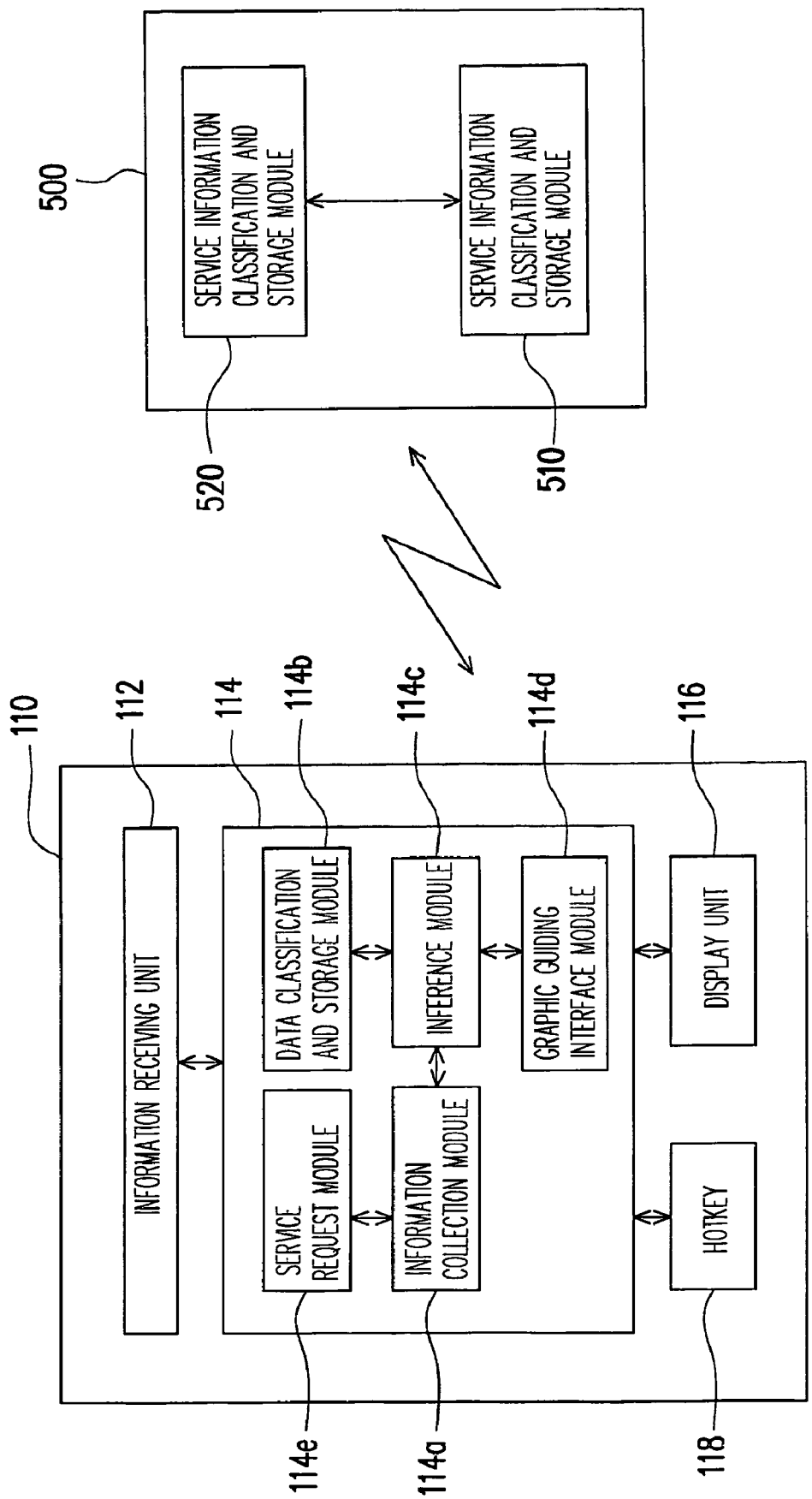
FIG. 6 is a schematic block diagram of a mobile device and a remote server in FIG. 5.

FIG. 5 is a diagram illustrating an operation environment of a context inference system according to an embodiment of the present invention. FIG. 6 is a schematic block diagram of a mobile device and a remote server in FIG. 5.

The context inference system and the operation environment thereof illustrated in FIG. 5 and FIG. 6 are similar to those illustrated in FIG. 1 and FIG. 2, and the only difference is that the context inference system illustrated in FIG. 5 further includes a remote server and service request module. Only the difference between the two embodiments will be described herein.

Referring to FIG. 5 and FIG. 6, the context inference system 100' further includes a remote server 500 and a service request module 114e.

The remote server 500 is a remotely disposed server which transmits information to the mobile device 110 through a wireless transmission channel. The wireless transmission channel may be a Bluetooth channel, a wireless local-area network (WLAN), a ultra-red transmission channel, a ZigBee transmission channel or other similar transmission channels. Besides, the remote server 500 may be a single server or a server group.

In the present embodiment, the remote server 500 provides a service information, wherein the service information is some information regarding the environment of the context inference system 100'. For example, in the present embodiment, the context inference system 100' is disposed in a furniture store, thus, the service information contains furniture related information.

The remote server 500 includes a service information classification and storage module 510 and a management data module 520.

The service information classification and storage module 510 classifies and stores the service information. In order to classify the characteristics of the objects precisely so as to define the user preference information and accordingly infer the context correctly, in an embodiment of the present invention, an ontology technique is adopted by the service information classification and storage module 510. However, the service information classification and storage module is not limited in the present invention, and any other suitable classification and storage system can be applied to the present invention.

The management data module 520 manages the service information classification and storage module 510. To be specific, the management data module 520 adds, deletes, and organizes the service information in the service information classification and storage module 510.

The service request module 114e is disposed in the context operation platform 114 of the mobile device 110. The service request module 114e obtains the service information provided by the remote server 500.

In the present embodiment, the mobile device 110 further receives the service information provided by the remote server 500 besides collecting the context information and the user preference information. Thus, in steps S301 and S303 of the context inference process 200, the service information is further collected and the context is inferred further according to the service information, so that a more precise recommendation information can be provided to the user.

Figure 7:
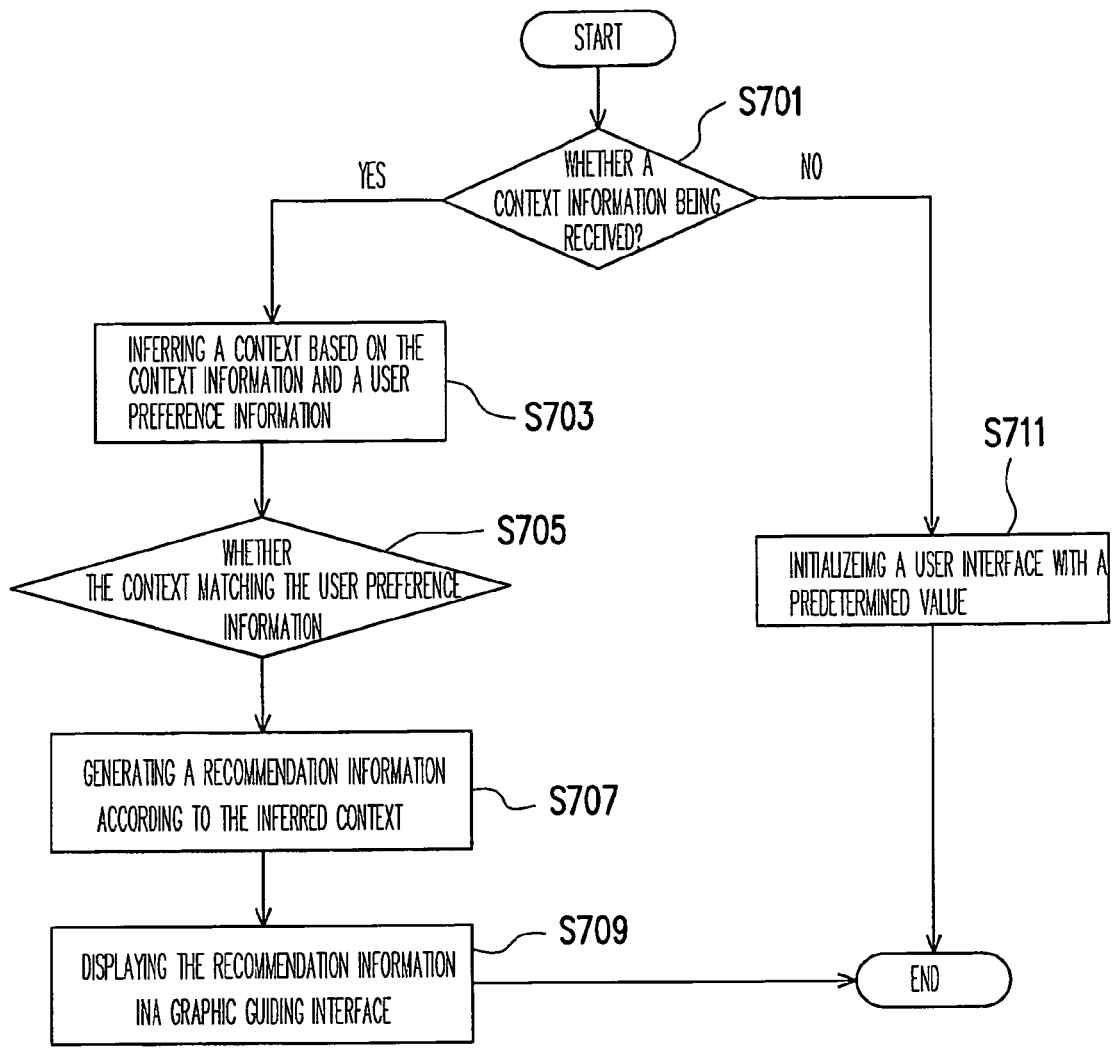
FIG. 7 is a flowchart of a context inference method according to an embodiment of the present invention.

FIG. 7 is a flowchart of a context inference method according to an embodiment of the present invention.

The context inference method is adaptable to foregoing mobile device having an information receiving unit and a context operation platform. When the user executes the context inference method in the mobile device, the context operation platform of the mobile device provides a recommendation information to the user.

Referring to FIG. 7, when the user powers on the mobile device 110 or presses down the hotkey 118 in foregoing specific environment, whether a context information is received is determined in step S701. In other words, the mobile device 110 determines whether a context information is provided by the environment.

If at least one context information is received in step S701, a context is inferred according to the at least one context information and a user preference information in step S703. Namely, in this method, the information desired by a user is forecasted based on the context around the environment and the characteristics of the user.

After that, whether the context matches the user preference information is determined in step S705. To be specific, whether the inferred context is up to the standard of a recommendation information is detected by using the user preference information. If the inferred context matches the user preference information, a recommendation information is generated according to the inferred context in step S707.

In the present embodiment, the context inference method further includes displaying the recommendation information through a graphic guiding interface module (step S709). In the present invention, the graphic guiding interface module is used for providing information to the user and receiving instructions from the user since the mobile device is very small and it is inconvenient to input data through a keyboard.

In the present embodiment, the step of inferring the context in the context inference method includes the convergent search and the expanded search. These search patterns have been described above with reference to FIG. 4a and FIG. 4b therefore will not be described herein.

If the at least one context information is not received in step S701, then a user interface is initialized with a predetermined value in step S711.

If the context does not match the user preference information in step S705, then a user interface is initialized with a predetermined value in step S711.

In another embodiment of the present invention, the context inference method further includes updating the user preference information to record the fact that the user prefers the recommendation information when the user accepts the recommendation information so that the fact can be used as a reference factor during the next inference process. Additionally, the context inference method further includes updating the user preference information to record the fact that the user does not prefer the recommendation information when the user does not accept the recommendation information so that the fact can be used as a reference factor during the next inference process. Since the context operation platform in the mobile device 110 has an intelligent inference module integrated with soft computing technique (for example, implemented with SOM technique), the subsequent inference will become more and more precise with the constantly updated experience factors.

In another embodiment of the present invention, in step S701, whether a service information is received is further determined. If the service information is received, then in step S703, the context is inferred further based on the service information.

The context inference method described above can be implemented as computer readable code recorded in a computer readable recording medium. The computer readable recording medium can be any data storage device which can be read by a computer system. For example, the computer readable recording medium may be a read-only memory (ROM), a random-access memory (RAM), a CD-ROM, a magnetic tape, a floppy disk, an optical data storage device, and a carrier (for example, data transmission through the Internet).

It should be mentioned here that besides being applied to a furniture store for providing furniture related information, the present invention may also be applied to other environments. For example, the present invention may also be applied to a supermarket for providing food related information, to a fashion store for providing fashion coordination suggestions, to an amusement park for providing suggestions in preferred games and facilities, to a second-hand car dealer shop for giving suggestions in vehicles and related information, and to a realty agency system for providing related information of desired houses to home buyers etc. In other words, as long as a user is in an environment integrated with one of foregoing systems, the user can receive a service information through a mobile device, and related information can be provided to the user through a context operation platform in the mobile device.

In summary, a mobile device, a wireless information receiving/transmitting technique (for example, a RFID technique), a data classification and storage technique, (for example, an ontology technique), and an inference technique (for example, a soft computing technique implemented with SOM technique) are adopted in the present invention for providing different context interfaces to a user in a mobile device. According to the present invention, a real-time and interactive graphic service can be provided to a user according to the location and habits of the user through content sensing and logic inference, thus, the applicability of a content service can be effectively improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A context inference system, comprising:
a mobile device, comprising:
a information receiving unit, receiving at least one context information; and
a context operation platform, coupled to the information receiving unit and performing a context inference process, the context operation platform comprising:
an information collection module, collecting information used for inferring a context;
a data classification and storage module, storing and classifying a user preference information of a user; and
a inference module, inferring the context; and
at least one information sending unit, transmitting the at least one context information to the mobile device, wherein the at least one information sending unit is mounted on at least one object, and the at least one context information is a related information of the at least one object;
wherein the context operation platform performs the context inference process based on the received context information and the user preference information in order to forecast a need of the user and provide a recommendation information to the user,
wherein the context inference process comprises: receiving and collecting the at least one context information by using the information receiving unit and the information collection module; inferring the context based on the user preference information and the at least one context information by using the inference module; and generating the recommendation information according to the context by using the inference module,
wherein the step of inferring the context comprises a convergent search and an expanded search.

2. The context inference system according to claim 1, wherein the mobile device further comprises a display unit, the context operation platform further comprises a graphic guiding interface module, and the context inference process further comprises displaying the recommendation information in the display unit through the graphic guiding interface module.

3. The context inference system according to claim 1, wherein the context inference process further comprises updating the user preference information to record that the user prefers the recommendation information when the user accepts the recommendation information.

4. The context inference system according to claim 1, wherein the context inference process further comprises updating the user preference information to record that the user does not prefer the recommendation information when the user does not accept the recommendation information.

5. The context inference system according to claim 1, wherein the related information comprises a plurality of characteristic values regarding the at least one object, a plurality of characteristic values regarding the location of the at least one object, a current time, or a combination of the characteristic values regarding the at least one object, the characteristic values regarding the location of the at least one object, and the current time.

6. The context inference system according to claim 1, wherein the information receiving unit is a radio frequency (RF) reader and the information sending unit is a RFID tag.

7. The context inference system according to claim 1, wherein the data classification and storage module comprises an ontology technique.

8. The context inference system according to claim 1, wherein the inference module comprises a soft computing clustering technique.

9. The context inference system according to claim 8, wherein the soft computing clustering technique is a self-organizing map (SOM) technique.

10. The context inference system according to claim 1, wherein the mobile device further comprises a hotkey for turning on the information receiving unit to receive the at least one context information.

11. A context inference system, comprising:
a mobile device, comprising:
- a information receiving unit, receiving at least one context information; and
- a context operation platform, coupled to the information receiving unit and performing a context inference process, the context operation platform comprising:
- an information collection module, collecting an information used for inferring a context;
- a data classification and storage module, storing and classifying a user preference information of a user;
- an inference module, inferring the context; and
- a service request module, obtaining a service information;
- at least one information sending unit, transmitting the at least one context information to the mobile device, wherein the at least one information sending unit is mounted on at least one object, and the at least one context information is a related information of the at least one object; and
- a remote server, providing the service information, the remote server comprising:
- a service information classification and storage module, classifying and storing a content regarding the service information; and
- a management data module, managing the service information classification and storage module;
- wherein the context operation platform performs the context inference process based on the context information, the service information, and a user preference information in order to forecast a need of the user and provide a recommendation information to the user.

12. The context inference system according to claim 11, wherein the context inference process comprises:
- receiving and collecting the at least one context information and the service information by using the information receiving unit and the information collection module;
- inferring the context based on the user preference information, the at least one context information, and the service information by using the inference module; and
- generating the recommendation information according to the context by using the inference module.

13. The context inference system according to claim 12, wherein the mobile device further comprises a display unit, the context operation platform further comprises a graphic guiding interface module, and the context inference process further comprises displaying the recommendation information in the display unit by using the graphic guiding interface module.

14. The context inference system according to claim 12, wherein the step of inferring the context comprises a convergent search and an expanded search.

15. The context inference system according to claim 12, wherein the context inference process further comprises updating the user preference information to record that the user prefers the recommendation information when the user accepts the recommendation information.

16. The context inference system according to claim 12, wherein the context inference process further comprises updating the user preference information to record that the user does not prefer the recommendation information when the user does not accept the recommendation information.

17. The context inference system according to claim 11, wherein the related information comprises a plurality of characteristic values regarding the at least one object, a plurality of characteristic values regarding the location of the at least one object, a current time, or a combination of the characteristic values regarding the at least one object, the characteristic values regarding the location of the at least one object, and the current time.

18. The context inference system according to claim 11, wherein the information receiving unit is a RFID reader and the information sending unit is a RFID tag.

19. The context inference system according to claim 11, wherein the data classification and storage module comprises an ontology technique.

20. The context inference system according to claim 11, wherein the service information classification and storage module comprises an ontology technique.

21. The context inference system according to claim 11, wherein the inference module comprises a soft computing clustering technique.

22. The context inference system according to claim 21, wherein the soft computing clustering technique is a SOM technique.

23. The context inference system according to claim 11, wherein the mobile device further comprises a hotkey for turning on the information receiving unit to receive the at least one context information.

24. A mobile device, comprising:
- an information receiving unit, receiving at least one context information; and
- a context operation platform, coupled to the information receiving unit, performing a context inference process, the context operation platform comprising:
- an information collection module, collecting an information used for inferring a context;
- a data classification and storage module, storing and classifying a user preference information of a user; and
- an inference module, inferring the context;
- wherein the context operation platform performs the context inference process based on the context information and the user preference information in order to forecast a need of the user and provide a recommendation information to the user,
- wherein the context operation platform further comprises a service request module for obtaining a service information from a remote server.

25. The mobile device according to claim 24 further comprising a display unit coupled to the context operation platform, wherein the context operation platform further comprises a graphic guiding interface module for displaying the recommendation information in the display unit.

26. The mobile device according to claim 24, wherein the context inference process is performed further based on the service information.

27. The mobile device according to claim 26, further comprising a display unit coupled to the context operation platform, wherein the context operation platform further comprises a graphic guiding interface module for displaying the recommendation information in the display unit.

28. The mobile device according to claim 24, wherein the information receiving unit is a RFID reader and the information sending unit is a RFID tag.

29. The mobile device according to claim 24, wherein the data classification and storage module comprises an ontology technique.

30. The mobile device according to claim 24, wherein the inference module comprises a soft computing clustering technique.

31. The mobile device according to claim 30, wherein the soft computing clustering technique is a SOM technique.

32. The mobile device according to claim 24 further comprising a hotkey for turning on the information receiving unit to receive the at least one context information.

33. A method for providing a service information, comprising:
classifying and storing the service information regarding a specific environment in the specific environment by using a service information classification and storage module;
mounting a information sending unit on at least one object in the specific environment to transmit a context information regarding the at least one object; and
providing the context information and the service information to a mobile device comprising a information receiving unit and a context operation platform when a user carrying the mobile device enters the specific environment and turns on the information receiving unit of the mobile device,
wherein the context operation platform comprises a information collection module for collecting information, a data classification and storage module for storing and classifying a user preference information, a inference module for inferring a context, and a service request module for obtaining the service information,
wherein the context operation platform forecasts a need of the user and provides a recommendation information to the user based on the context information, the service information, and the user preference information.

34. The service information providing method according to claim 33, wherein the information receiving unit is a RFID reader and the information sending unit is a RFID tag.

35. The service information providing method according to claim 33, wherein the data classification and storage module comprises an ontology technique.

36. The service information providing method according to claim 33, wherein the service information classification and storage module comprises an ontology technique.

37. The service information providing method according to claim 33, wherein the inference module comprises a soft computing clustering technique.

38. The service information providing method according to claim 37, wherein the soft computing clustering technique is a SOM technique.

* * * * *